US009674724B2

United States Patent
Kim et al.

(10) Patent No.: US 9,674,724 B2
(45) Date of Patent: Jun. 6, 2017

(54) METHOD AND APPARATUS FOR TRANSMITTING MEASUREMENT REPORT IN A WIRELESS COMMUNICATION SYSTEM

(71) Applicant: LG ELECTRONICS INC., Seoul (KR)

(72) Inventors: Kijun Kim, Anyang-si (KR); Illsoo Sohn, Anyang-si (KR); Hanbyul Seo, Anyang-si (KR); Jonghyun Park, Anyang-si (KR); Eunsun Kim, Anyang-si (KR); Hyungtae Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 216 days.

(21) Appl. No.: 14/371,389

(22) PCT Filed: Jan. 21, 2013

(86) PCT No.: PCT/KR2013/000466
§ 371 (c)(1),
(2) Date: Jul. 9, 2014

(87) PCT Pub. No.: WO2013/109111
PCT Pub. Date: Jul. 25, 2013

(65) Prior Publication Data
US 2014/0362720 A1    Dec. 11, 2014

Related U.S. Application Data

(60) Provisional application No. 61/588,668, filed on Jan. 20, 2012, provisional application No. 61/672,251, filed on Jul. 16, 2012.

(51) Int. Cl.
*H04W 4/00*     (2009.01)
*H04W 24/00*    (2009.01)
(Continued)

(52) U.S. Cl.
CPC ............ *H04W 24/10* (2013.01); *H04B 7/024* (2013.01); *H04B 7/0413* (2013.01);
(Continued)

(58) Field of Classification Search
CPC ...... H04W 72/02; H04W 24/10; H04B 7/024; H04B 7/0413; H04B 7/0617;
(Continued)

(56) References Cited

U.S. PATENT DOCUMENTS 9,008,583 B2 *  4/2015  Shi ........................ H04L 1/0028
                                                        370/252
2003/0099215 A1   5/2003  O'Shea
(Continued)

FOREIGN PATENT DOCUMENTS

| JP | 2011-249921 | 12/2011 |
| KR | 10-2008-0078110 | 8/2008 |
| KR | 10-2009-0094705 | 9/2009 |

OTHER PUBLICATIONS

PCT International Application No. PCT/KR2013/000466, Written Opinion of the International Searching Authority dated Apr. 30, 2013, 1 page.

*Primary Examiner* — Thai Hoang
(74) *Attorney, Agent, or Firm* — Lee Hong Degerman Kang Waimey

(57) ABSTRACT

A method and apparatus for transmitting a measurement report in a wireless communication system are disclosed. The method for transmitting a measurement report at a UE in the wireless communication system includes measuring received strengths and reception frequencies of first and second signals, and transmitting a measurement report including a frequency offset between the first and second signals, if the received strength of the second signal is equal to or larger than a predetermined threshold. The frequency (Continued)

offset is used to support cooperative transmission of transmission points transmitting the first and second signals.

16 Claims, 9 Drawing Sheets

(51) Int. Cl.

| | | |
|---|---|---|
| *H04W 24/10* | (2009.01) | |
| *H04B 7/024* | (2017.01) | |
| *H04B 7/0413* | (2017.01) | |
| *H04B 7/06* | (2006.01) | |
| *H04W 72/02* | (2009.01) | |
| *H04L 5/00* | (2006.01) | |
| *H04L 27/00* | (2006.01) | |
| *H04B 17/318* | (2015.01) | |

(52) U.S. Cl.
CPC ......... *H04B 7/0617* (2013.01); *H04B 7/0619* (2013.01); *H04B 7/0689* (2013.01); *H04L 5/005* (2013.01); *H04L 5/0035* (2013.01); *H04L 5/0053* (2013.01); *H04W 72/02* (2013.01); *H04B 7/0626* (2013.01); *H04B 7/0632* (2013.01); *H04B 7/0639* (2013.01); *H04B 17/318* (2015.01); *H04L 5/0023* (2013.01); *H04L 27/0014* (2013.01)

(58) Field of Classification Search
CPC .. H04B 7/0619; H04B 7/0626; H04B 7/0632; H04B 7/0639; H04B 5/0689; H04B 5/005; H04B 5/0053; H04B 5/0035; H04B 17/318; H04L 5/0023; H04L 27/0014
USPC .............. 370/328–338, 342–345, 348; 455/422.1–425, 432.1–444
See application file for complete search history.

(56) References Cited

U.S. PATENT DOCUMENTS

| | | | | |
|---|---|---|---|---|
| 2010/0273514 | A1* | 10/2010 | Koo | H04B 7/024 455/501 |
| 2011/0286376 | A1* | 11/2011 | Yoo | H04W 56/00 370/312 |
| 2013/0065612 | A1* | 3/2013 | Siomina | H04W 24/10 455/456.2 |
| 2013/0077569 | A1* | 3/2013 | Nam | H04W 52/288 370/328 |
| 2013/0201926 | A1* | 8/2013 | Nam | H04L 1/1685 370/329 |
| 2013/0324107 | A1* | 12/2013 | Lindoff | H04W 24/10 455/422.1 |
| 2014/0286219 | A1* | 9/2014 | Siomina | H04J 11/0023 370/311 |
| 2015/0256247 | A1* | 9/2015 | Haley | H04B 7/185 455/12.1 |
| 2015/0318972 | A1* | 11/2015 | Zhang | H04L 5/0057 370/329 |

* cited by examiner

FIG. 5
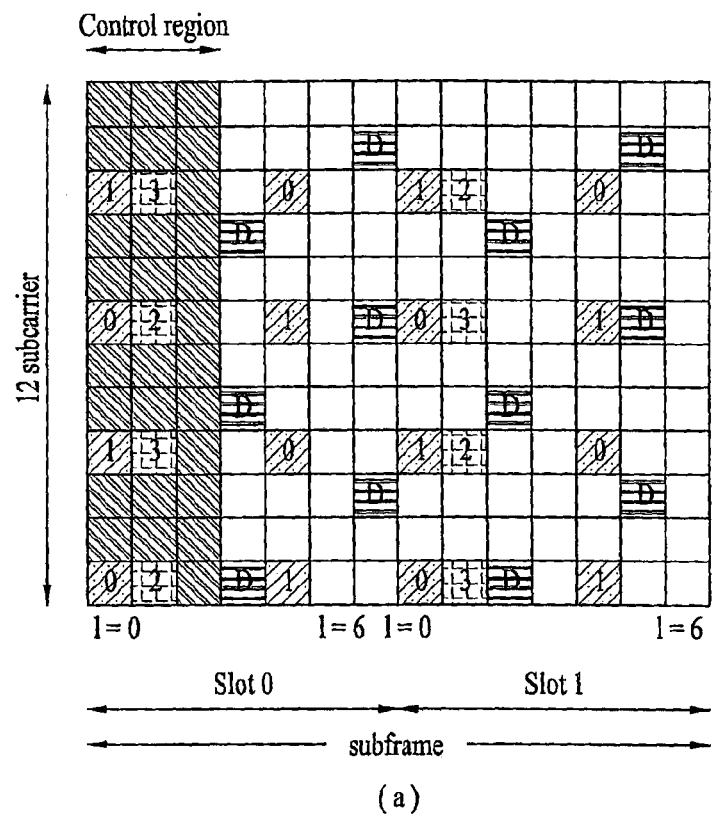
(a)
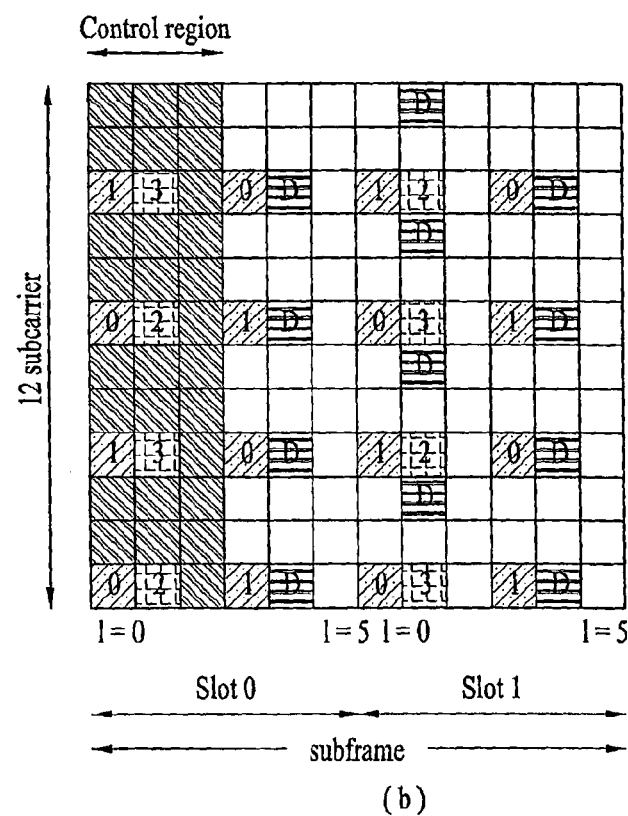
(b)

METHOD AND APPARATUS FOR TRANSMITTING MEASUREMENT REPORT IN A WIRELESS COMMUNICATION SYSTEM

CROSS-REFERENCE TO RELATED APPLICATIONS

This application is the National Stage filing under 35 U.S.C. 371 of International Application No. PCT/KR2013/000466, filed on Jan. 21, 2013, which claims the benefit of U.S. Provisional Application Ser. No. 61/588,668, filed on Jan. 20, 2012 and 61/672,251, filed on Jul. 16, 2012, the contents of which are all hereby incorporated by reference herein in their entirety.

TECHNICAL FIELD

The present invention relates to a wireless communication system, and more particularly, to a method and apparatus for transmitting a measurement report.

BACKGROUND ART

Wireless communication systems have been widely deployed in order to provide various types of communication services including voice or data. In general, a wireless communication system is a multiple access system that can support communication with multiple users by sharing available system resources (a bandwidth, transmission power, etc.). Examples of multiple access systems include Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), Multi Carrier Frequency Division Multiple Access (MC-FDMA), etc.

DISCLOSURE

Technical Problem

An object of the present invention devised to solve the conventional problem is to provide techniques related to a method for including the frequency offset of each transmission point in a measurement report, when the measure report is transmitted.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In an aspect of the present invention, a method for transmitting a measurement report at a User Equipment (UE) in a wireless communication system includes measuring received strengths and reception frequencies of first and second signals, and transmitting a measurement report including a frequency offset between the first and second signals, if the received strength of the second signal is equal to or larger than a predetermined threshold. The frequency offset is used to support cooperative transmission of transmission points transmitting the first and second signals.

In another aspect of the present invention, a UE in a wireless communication system includes a transmission module, and a processor. The processor is configured to measure received strengths and reception frequencies of first and second signals, and transmit a measurement report including a frequency offset between the first and second signals, if the received strength of the second signal is equal to or larger than a predetermined threshold. The frequency offset is used to support cooperative transmission of transmission points transmitting the first and second signals.

In another aspect of the present invention, a method for receiving a measurement report at a transmission point in a wireless communication system includes receiving a measurement report from a UE that has received first and second signals. The measurement report includes a frequency offset between the first and second signals, if the received strength of the second signal is equal to or larger than a predetermined threshold, and the frequency offset is used to support cooperative transmission of transmission points transmitting the first and second signals.

In a further aspect of the present invention, a transmission point in a wireless communication system includes a reception module and a processor. The processor is configured to receive a measurement report from a UE that has received first and second signals, and the measurement report includes a frequency offset between the first and second signals, if the received strength of the second signal is equal to or larger than a predetermined threshold, and the frequency offset is used to support cooperative transmission of transmission points transmitting the first and second signals.

The above aspects of the present invention may include all or a part of the followings.

The support of cooperative transmission may include at least one of determination as to whether the transmission points are to perform cooperative transmission, determination of a cooperative transmission scheme of the transmission points, or correction of transmission frequencies of one or more of the transmission points.

The first signal may be a cell-specific reference signal transmitted by a first transmission point being a serving cell of the UE and the second signal may be a cell-specific reference signal transmitted by a second transmission point being neighbor cell of the serving cell.

The second transmission point may be included in a neighbor cell list received from the first transmission point.

The second transmission point may be indicated in a neighbor cell list received from the first transmission point by the first transmission point.

The first and second signals may be Channel State Information-Reference Signals (CSI-RSs).

The first and second signals may be indicated for frequency offset reporting in a CSI-RS list related to cooperative transmission.

The first signal may be a first CSI-RS listed in the CSI-RS list.

The CSI-RS list may include a plurality of CSI-RS configurations.

The measurement report may further include a Reference Signal Time Difference (RSTD) between the transmission points transmitting the first and second signals, and the RSTD may be used to support the cooperative transmission.

The RSTD may be the difference between the starts of subframes received from the transmission points.

The cooperative transmission may be joint transmission.

Advantageous Effects

According to the present invention, a more effective Coordinated MultiPoint (CoMP) transmission can be performed, taking into account a frequency offset incurred by an oscillator error of a transmission point.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings:

FIG. 5 is a view referred to for describing Reference Signals (RSs);

BEST MODE

Figure 1:
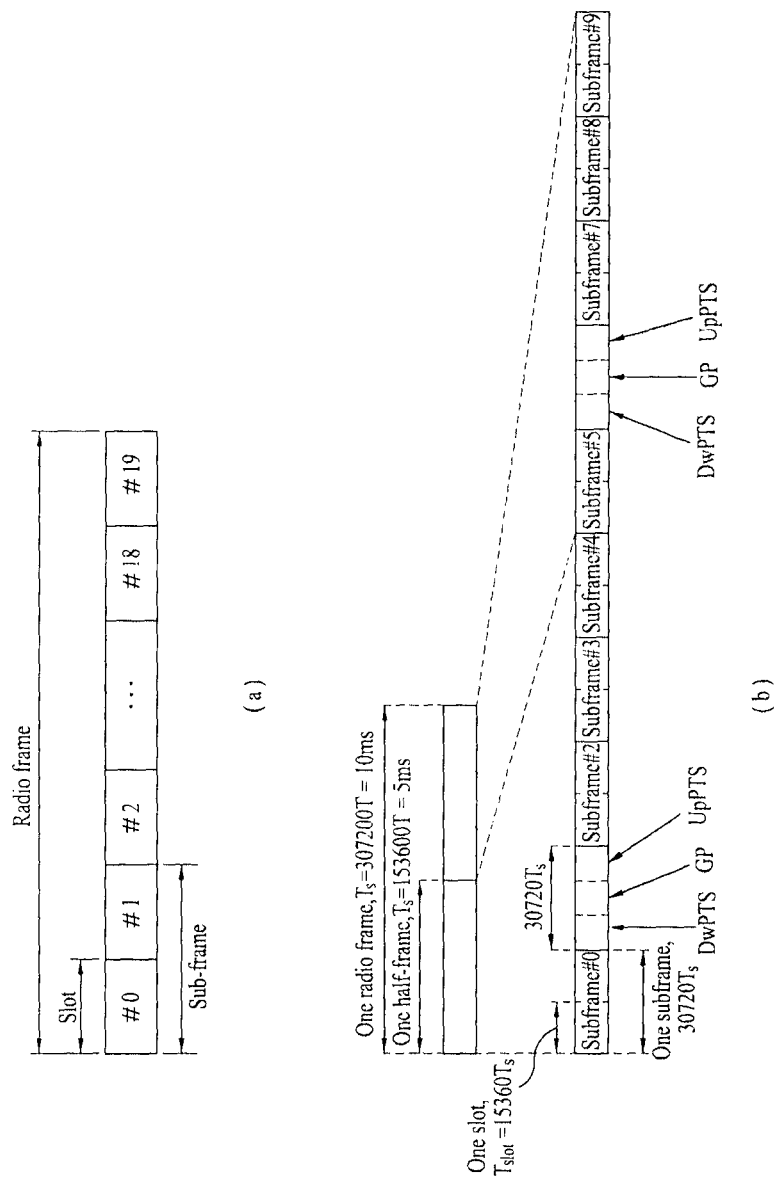
FIG. 1 illustrates the structure of a radio frame.

The embodiments of the present invention described hereinbelow are combinations of elements and features of the present invention. The elements or features may be considered selective unless otherwise mentioned. Each element or feature may be practiced without being combined with ether elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, $3^{rd}$ Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

With reference to FIG. 1, the structure of a radio frame will be described below.

In a cellular Orthogonal Frequency Division Multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
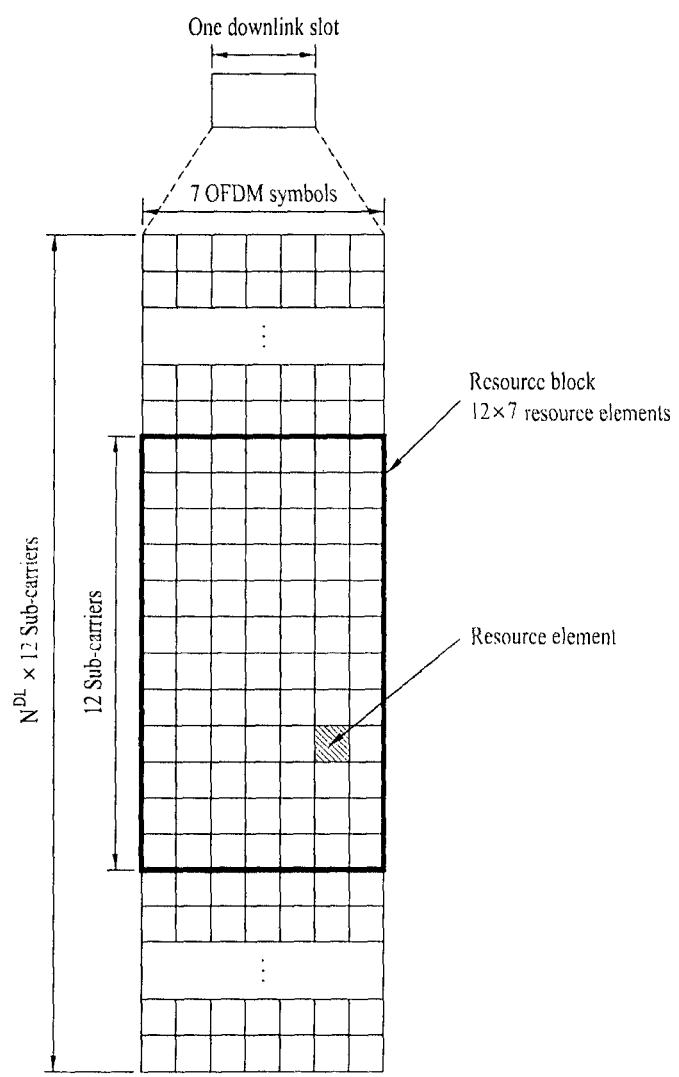
FIG. 2 illustrates the structure of a downlink resource grid for the duration of one downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, $N^{DL}$ depends on a downlink transmission bandwidth. An uplink slot may have the same structure as a downlink slot.

Figure 3:
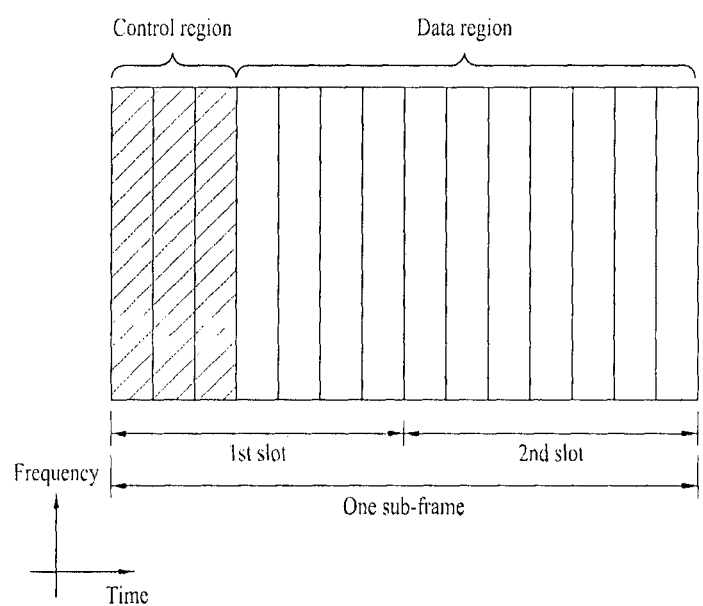
FIG. 3 illustrates the structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
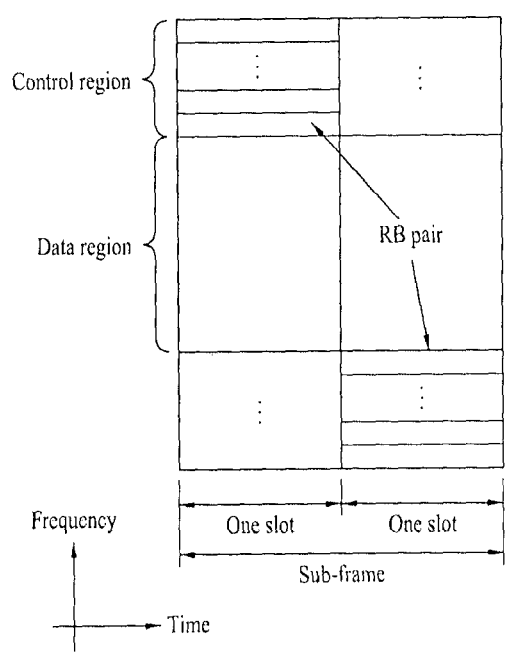
FIG. 4 illustrates the structure of an uplink subframe.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signals (RSs)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between Transmission (Tx) antennas and Reception (Rx) antennas is required for successful signal reception. Accordingly, an RS should be transmitted through each Tx antenna.

RSs may be divided into downlink RSs and uplink RSs. In the current LTE system, the uplink RSs include:

i) DeModulation-Reference Signal (DM-RS) used for channel estimation for coherent demodulation of information delivered on a PUSCH and a PUCCH; and ii) Sounding Reference Signal (SRS) used for an eNB or a network to measure the quality of an uplink channel in a different frequency.

The downlink RSs are categorized into:

i) Cell-specific Reference Signal (CRS) shared among all UEs of a cell;

ii) UE-specific RS dedicated to a specific UE;

iii) DM-RS used for coherent demodulation of a PDSCH, when the PDSCH is transmitted;

iv) Channel State Information-Reference Signal (CSI-RS) carrying CSI, when downlink DM-RSs are transmitted;

v) Multimedia Broadcast Single Frequency Network (MBSFN) RS used for coherent demodulation of a signal transmitted in MBSFN mode; and vi) positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

CRSs serve two purposes, that is, channel information acquisition and data demodulation. A UE-specific RS is used only for data demodulation. CRSs are transmitted in every subframe in a broad band and CRSs for up to four antenna ports are transmitted according to the number of Tx antennas in an eNB.

For example, if the eNB has two Tx antennas, CRSs for antenna ports 0 and 1 are transmitted. In the case of four Tx antennas, CRSs for antenna ports 0 to 3 are respectively transmitted.

FIG. 5 illustrates patterns in which CRSs and DRSs are mapped to a downlink RB pair, as defined in a legacy 3GPP LTE system (e.g. conforming to Release-8). An RS mapping unit, i.e. a downlink RB pair may include one subframe in time by 12 subcarriers in frequency. That is, an RB pair includes 14 OFDM symbols in time in the case of the normal CP (see FIG. 5(a)) and 12 OFDM symbols in time in the case of the extended CP (see FIG. 5(b)).

In FIG. 5, the positions of RSs in an RB pair for a system where an eNB supports four Tx antennas are illustrated. Reference numerals 0, 1, 2 and 3 denote the REs of CRSs for first to fourth antenna ports, antenna port 0 to antenna port 3, respectively, and reference character 'D' denotes the positions of DRSs.

CSI-RS

CSI-RS is an RS used for channel measurement in an LTE-A system supporting up to eight antenna ports on downlink. CSI-RS differs in this aspect from CRS used for both channel measurement and data demodulation and thus it is not necessary to transmit CSI-RSs in every subframe like CRSs. CSI-RS is used in Transmission Mode 9. For data demodulation, DM-RS is used.

More specifically, CSI-RSs may be transmitted through 1, 2, 4 or 8 antenna ports. Antenna port 15 may be used for one antenna port, antenna ports 15 and 16 for two antenna ports, antenna ports 15 to 18 for four antenna ports, and antenna ports 15 to 22 for eight antenna ports.

CSI-RSs may be generated by the following [Equation 1].

$$r_{l,n_s}(m) = \frac{1}{\sqrt{2}}(1 - 2 \cdot c(2m)) + j\frac{1}{\sqrt{2}}(1 - 2 \cdot c(2m+1)), \quad \text{[Equation 1]}$$

$$m = 0, 1, \ldots, N_{RB}^{max,DL} - 1$$

Where $r_{l,n_s}(m)$ denotes the generated CSI-RSs, $c(i)$ denotes a pseudo-random sequence, $n_s$ is a slot number, l is an OFDM symbol index, and $N_{RB}^{max,DL}$ denotes the maximum number of RBs in a downlink bandwidth.

The CSI-RSs generated by [Equation 1] may be mapped to REs on a per-antenna port basis by the following equation.

$$a_{k,l}^{(p)} = w_{l''} \cdot r_{l,n_s}(m') \quad \text{[Equation 2]}$$

$$k = k' + 12m +
\begin{cases}
-0 & \text{for } p \in \{15, 16\}, \text{ normal cyclic prefix} \\
-6 & \text{for } p \in \{17, 18\}, \text{ normal cyclic prefix} \\
-1 & \text{for } p \in \{19, 20\}, \text{ normal cyclic prefix} \\
-7 & \text{for } p \in \{21, 22\}, \text{ normal cyclic prefix} \\
-0 & \text{for } p \in \{15, 16\}, \text{ extended cyclic prefix} \\
-3 & \text{for } p \in \{17, 18\}, \text{ extended cyclic prefix} \\
-6 & \text{for } p \in \{19, 20\}, \text{ extended cyclic prefix} \\
-9 & \text{for } p \in \{21, 22\}, \text{ extended cyclic prefix}
\end{cases}$$

$$l = l' + \begin{cases} l'' & \text{CSI reference signal configurations 0-19,} \\ & \text{normal cyclic prefix} \\ 2l'' & \text{CSI reference signal configurations 20-31,} \\ & \text{normal cyclic prefix} \\ l'' & \text{CSI reference signal configurations 0-27,} \\ & \text{extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

In [Equation 2], k' and l' may be determined according to CSI-RS configurations as illustrated in [Table 1].

TABLE 1

| CSI RS Configuration | | Number of CSI RSs configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |

TABLE 1-continued

| | CSI RS Configuration | Number of CSI RSs configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame | 20 | (11, 1) | 1 | (11, 1) | 1 | (11, 1) | 1 |
| structure | 21 | (9, 1) | 1 | (9, 1) | 1 | (9, 1) | 1 |
| type 2 | 22 | (7, 1) | 1 | (7, 1) | 1 | (7, 1) | 1 |
| only | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

Figure 6:
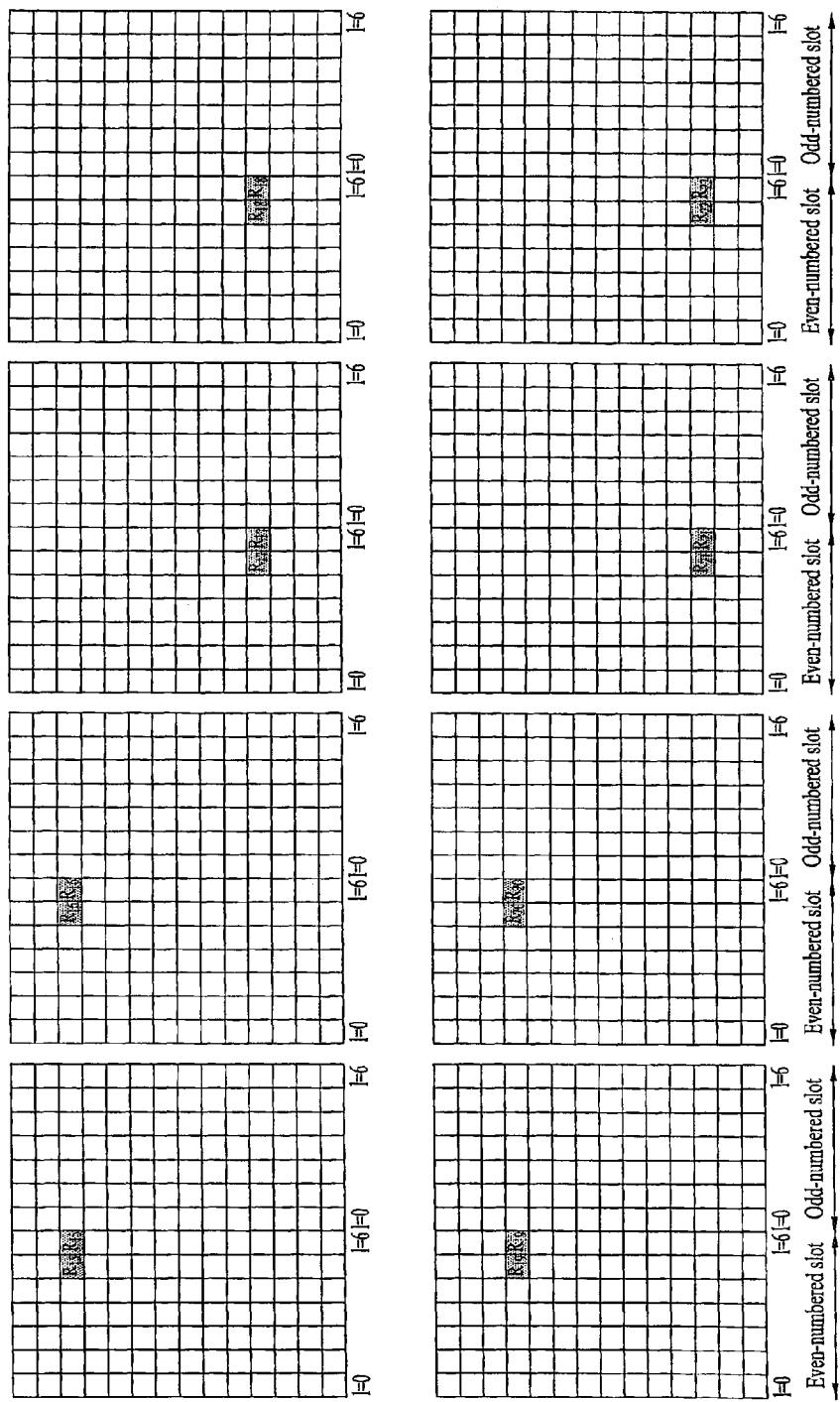
FIG. 6 is a view referred to for describing Channel State Information-RSs (CSI-RSs)

CSI-RSs are mapped to REs on a per-antenna port basis according to a specific CSI-RS configuration by [Equation 1] and [Equation 2]. For example, in the case of CSI-RS Configuration 0, CSI-RSs are mapped in the manner illustrated in FIG. 6.

As described before, CSI-RSs are transmitted in a specific subframe, not in every subframe. Specifically, CSI-RSs may be transmitted in a subframe satisfying the following [Equation 3], referring to a CSI-RS subframe configuration as illustrated in [Table 2] below.

TABLE 2

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$-5 |

TABLE 2-continued

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 15-34 | 20 | $I_{CSI-RS}$-15 |
| 35-74 | 40 | $I_{CSI-RS}$-35 |
| 75-154 | 80 | $I_{CSI-RS}$-75 |

$$(10n_f + \lfloor n_s/2 \rfloor - \Delta_{CSI-RS}) \bmod T_{CSI-RS} = 0 \quad \text{[Equation 3]}$$

where $T_{CSI-RS}$ denotes the transmission period of CSI-RSs, $\Delta_{CSI-RS}$ is an offset, $n_f$ is a system frame number, and $n_s$ is a slot number.

These CSI-RSs may be signaled to a UE in a CSI-RS config Information Element (IE) described in [Table 3] below.

TABLE 3

```
CSI-RS-Config-r10 ::=         SEQUENCE {
    csi-RS-r10                                    CHOICE {
        release                                       NULL,
        setup                                         SEQUENCE {
            antennaPortsCount-r10                         ENUMERATED     {an1,
an2, an4, an8},
            resourceConfig-r10                            INTEGER (0..31),
            subframeConfig-r10                            INTEGER (0..154),
            p-C-r10
INTEGER (-8..15)
        }
    }
                                                  OPTIONAL,
    -- Need ON
    zeroTxPowerCSI-RS-r10         CHOICE {
        release                                       NULL,
        setup                                         SEQUENCE {
            zeroTxPowerResourceConfigList-r10             BIT STRING (SIZE (16)),
            zeroTxPowerSubframeConfig-r10                 INTEGER (0..154)
        }
    }
```

TABLE 3-continued

OPTIONAL

-- Need ON
}

In [Table 3], 'antennaPortsCount-r10' indicates the number of antennas through which CSI-RSs are transmitted (one of 1, 2, 4 and 8 is selected), and 'resourceConfig-r10' specifies REs carrying the CSI-RSs in one RB in the time-frequency domain. 'subframeConfig-r10' indicates a subframe carrying the CSI-RSs and the ratio of a CSI-RS Energy Per Resource Element (EPRE) to a PDSCH EPRE. In addition, the eNB transmits information about zero-power CSI-RSs.

In the CSI-RS Config IE, 'resourceConfig-r10' indicates the positions of the CSI-RSs. Specifically, 'resourceConfig-r10' indicates the positions of symbols and subcarriers carrying the CSI-RSs in one RB according to a CSI-RS configuration number ranging from 0 to 31 in [Table 1].

CSI Feedback

Multiple Input Multiple Output (MIMO) schemes may be categorized into open-loop MIMO and closed-loop MIMO. A MIMO transmitter performs MIMO transmission without CSI feedback from a MIMO receiver in the open-loop MIMO scheme, whereas the MIMO transmitter performs MIMO transmission based on CSI feedback from the MIMO receiver in the closed-loop MIMO scheme. To obtain the multiplexing gain of MIMO Tx antennas, each of the transmitter and the receiver may perform beamforming based on CSI in the closed-MIMO scheme. The transmitter (e.g. an eNB) may allocate an uplink control channel or uplink shared channel to the receiver (e.g. a UE) so that the receiver can feedback CSI to the transmitter.

The receiver may feedback a Rank Indicator (RI), a Precoding Matrix Index (PMI), and a Channel Quality Indicator (CQI) as CSI to the transmitter.

An RI is information about a channel rank. The channel rank is the number of layers (or streams) carrying different information in the same time-frequency resources. Because the RI depends dominantly on the long-term fading of a channel, it may be fed back in a longer period than a PMI and a CQI.

A PMI is information about a precoding matrix used for transmission at the transmitter, reflecting the spatial characteristics of a channel. Precoding refers to mapping between transmission layers and Tx antennas and thus a layer-antenna mapping relationship may be determined according to a precoding matrix. The PMI indicates the index of a UE-preferred precoding matrix for the eNB, which is determined based on a metric such as Signal to Interference plus Noise Ratio (SINR). To reduce the feedback overhead of precoding information, the transmitter and the receiver may preliminarily share a codebook including a plurality of precoding matrices and thus the receiver may feedback only the index of a specific precoding matrix selected from the codebook.

Acquisition of an additional multi-user diversity using Multi-User MIMO (MU-MIMO) is under consideration in a system supporting an extended antenna configuration (e.g. an LTE-A system). In MU-MIMO, an interference channel exists between UEs multiplexed in an antenna domain. Therefore, when the eNB transmits a downlink signal based on CSI feedback received from one UE, it needs to perform the downlink transmission in a manner that avoids interference with other UEs. Hence, for a reliable MU-MIMO operation, CSI should be fed back with more accuracy than for a Single-User MIMO (SU-MIMO) operation.

To enable more accurate CSI measurement and reporting, a new CSI feedback scheme may be used by improving conventional CSI including an RI, a PMI, and a CQI. For example, precoding information fed back by a receiver may be indicated by a combination of two PMIs. One of the two PMIs (a first PMI) may be referred to as W1 having a long term and/or wideband property and the other PMI (a second PMI) may be referred to as W1 having a short term and/or subband property. A final PMI may be determined by a function of W1 and W2. For example, let the final PMI be denoted by W. Then it may defined that W=W1*W2 or W=W2*W1.

A CQI is information representing channel quality or channel strength. The CQI may be represented as the index of a predetermined Modulation and Coding Scheme (MCS). That is, a CQI index feedback indicates a modulation scheme and a code rate. In general, the CQI reflects a received SINR that can be obtained when an eNB configures a spatial channel using a PMI.

The current LTE/LTE-A system defines 'CSI reference resource' related to channel measurement for the above-described CSI feedback/reporting. The CSI reference resource is defined by a group of physical RBs corresponding to a frequency band for which a CQI is calculated in the frequency domain. From a time perspective, for CSI transmission/reporting in subframe n, the CSI reference resource is defined by a single downlink subframe, $n-n_{CQI\_ref}$. i) For periodic CSI reporting, $n-n_{CQI\_ref}$ is the smallest value greater than or equal to 4, which is a valid downlink subframe. ii) For aperiodic CSI reporting, $n-n_{CQI\_ref}$ is typically the reference resource in the same valid downlink subframe as a corresponding CSI request in a DCI format for uplink transmissions. iii) For aperiodic CSI reporting triggered by a Random Access Response Grant carrying a CSI request, $n-n_{CQI\_ref}$ equals 4. A downlink subframe is considered valid when it is configured as a downlink subframe for a particular UE, it is not an MBSFN subframe except for Transmission Mode 9, it contains a DwPTS with a predetermined size or larger, it does not fall within a configured measurement gap for that UE, and for periodic CSI reporting, it should be an element of a CSI subframe set when that UE is configured with CSI subframe sets. A higher layer may configure CSI subframe sets ($C_{CSI,0}$, $C_{CSI,1}$) for the UE. The current standard defines that the CSI reference resource is included in one of the two CSI subframe sets ($C_{CSI,0}$, $C_{CSI,1}$), not in both.

Coordinated Multi-Point (CoMP)

To satisfy enhanced system performance requirements for the 3GPP LTE-A system, CoMP transmission and reception technology known as co-MIMO, collaborative MIMO or network MIMO has been proposed. The CoMP technology can increase the performance of UEs located at a cell edge and average sector throughput.

It is known that Inter-Cell Interference (ICI) generally degrades the performance of a UE at a cell edge and average sector throughput in a multi-cellular environment with a frequency reuse factor of 1. To offer an appropriate throughput performance to a cell-edge UE in an environment constrained by interference, a simple ICI mitigation technique such as UE-specific power control-based Fractional Frequency Reuse (FFR) is used in the legacy LTE system. However, it may be preferred to reduce the ICI or reuse the ICI as a desired signal for the UE, rather than to decrease the utilization of frequency resources per cell. For this purpose, CoMP transmission techniques may be adopted.

Downlink CoMP schemes are classified largely into Joint Processing (JP), and Coordinated Scheduling/Beamforming (CS/CB).

According to the JP scheme, each point (eNB) of a CoMP cooperation unit may use data. The CoMP cooperation unit refers to a set of eNBs used for a CoMP transmission operation. The JP scheme is further branched into joint transmission and dynamic cell selection.

Joint transmission is a technique of transmitting PDSCHs from a plurality of points (a part or the whole of a CoMP cooperation unit) at one time. That is, a plurality of transmission points may simultaneously transmit data to a single UE. The joint transmission scheme can improve the quality of a received signal coherently or non-coherently and actively eliminate interference with other UEs, as well.

Dynamic cell selection is a technique of transmitting a PDSCH from one point of a CoMP cooperation unit at one time. That is, one point of the CoMP cooperation unit transmits data to a single UE at a given time point, while the other points of the CoMP cooperation unit do not transmit data to the UE at the time point. A transmission point to transmit data to a UE may be dynamically selected.

Meanwhile, in the CS/CB scheme, a CoMP cooperation unit may perform cooperative beamforming for data transmission to a single UE. While only a serving cell transmits data to the UE, user scheduling/beamforming may be determined through coordination among cells of the CoMP cooperation unit.

Uplink CoMP reception refers to reception of an uplink signal through cooperation among a plurality of geographically separate points. Uplink CoMP schemes include Joint Reception (JR) and Coordinated Scheduling/Beamforming (CS/CB).

In JR, a plurality of reception points receive a signal transmitted on a PUSCH. CS/CB is a technique in which while only one point receives a PUSCH, user scheduling/beamforming is determined through coordination among cells of a CoMP cooperation unit.

In this CoMP system, multi-cell eNBs can support data for a UE. In addition, the eNBs support one or more UEs simultaneously in the same radio frequency resources, thereby increasing system performance. The eNBs may also operate in Space Division Multiple Access (SDMA) based on CSI between a UE and the eNBs.

A serving eNB and one or more cooperative eNBs are connected to a scheduler through a backbone network in the CoMP system. The scheduler may receive channel information about the channel states between a UE and the cooperative eNBs, measured by each cooperative eNB and operate based on the channel information. For example, the scheduler may schedule information for cooperative MIMO for the serving eNB and the one or more cooperative eNBs. That is, the scheduler may transmit a command directly to each eNB in regard to the cooperative MIMO operation.

As noted from the above description, it can be said that a CoMP system operates as a virtual MIMO system by grouping a plurality of cells into one group. Basically, the CoMP system adopts a MIMO communication scheme using multiple antennas.

Measurement/Measurement Report

A measurement report is used for many techniques designed to ensure the mobility of UEs (handover, random access, cell search, etc.) or for one of the techniques. Since the measurement report needs a certain degree of coherent demodulation, a UE may perform measurement after acquiring synchronization and physical layer parameters, except for measurement of a received signal strength. The measurement report conceptually covers Radio Resource Management (RRM) measurement of measuring the signal strengths or signal strengths to total reception power of a serving cell and neighbor cells, including Reference Signal Received Power (RSRP), Received Signal Strength Indicator (RSSI), and Reference Signal Received Quality (RSRQ), and Radio Link Monitoring (RLM) measurement of measuring link quality with respect to the serving cell to thereby determine whether a radio link has been failed.

RSRP is defined as the linear average over the power contributions of REs that carry downlink CRSs.

RSSI is defined as the linear average of the total received power of a UE. The RSSI is measured from OFDM symbols carrying RSs for antenna port 0, including interference and noise power from neighbor cells. If a specific subframe is indicated for RSRQ measurement by higher-layer signaling, the RSSI is measured over all OFDM symbols of the indicated subframe.

RSRQ is defined as (N×RSRP/RSSI), where N is the number of RBs over the measurement bandwidth of RSSI.

A measurement report is made basically using CRSs. In the present invention, a measurement report may be based on CRS, CSI-RS or DMRS, alone or in combination. The measurement report may be performed for a specific antenna port(s) from among antenna ports through which RSs are transmitted or for a specific RS configuration. For example, in the case of CSI-RS, a plurality of RS configurations may be allocated to the same subframe and each RS configuration may include 2-port, 4-port, or 8-port CSI-RSs and may be transmitted at a different transmission time.

Transmission of a measurement report may be determined by the following conditions for event-based measurement report decision:
 i) when the measurement of a serving cell becomes larger than an absolute threshold;
 ii) when the measurement of the serving cell becomes smaller than the absolute threshold;
 iii) when the measurement of a neighbor cell becomes larger than the measurement of the serving cell by an offset;
 iv) when the measurement of the neighbor cell becomes larger than the absolute threshold; and
 v) when the measurement of the serving cell becomes smaller than the absolute threshold and the measurement of the neighbor cell becomes larger than another absolute threshold.

Herein, the measurements may be the afore-described RSRP values.

Alternatively, it may be regulated that a measurement report is transmitted only when each of the above-described conditions for measurement report decision is kept satisfied for a predetermined time or longer.

In the CoMP environment, the network may determine to transmit a signal by an afore-described CoMP transmission scheme based on information included in a measurement report received from a UE. Especially in joint transmission (hereinafter, referred to as CoMP JT), the UE may calculate a phase offset for each signal to reinforce signals transmitted from a plurality of transmission points and eNBs may transmit beamforming signals in CoMP JT based on the reported phase offsets.

To transmit or receive a radio signal in an RF band, a carrier frequency may be generated from an oscillator. UEs should be synchronized to a serving eNB, for data transmission and reception. This process involves adjusting a carrier frequency to the oscillation frequency of the serving eNB. An error may occur to an actual operation of an oscillator in a transmission point. For example, if an eNB uses an oscillator having an allowed error of 0.05 PPM, a carrier frequency error of up to 100 MHz may occur to a 2-GHz carrier frequency. The eNB may have a carrier frequency between (2G-100) Hz and (2G+100) Hz.

In CoMP JT, a plurality of transmission points may use different oscillators because they transmit signals at the same time. That is, a UE may receive the signals from the plurality of transmission points in different carrier frequencies. If the UE is synchronized to its transmission point, that is, a serving eNB, the signals received from the other transmission points may have frequency offsets. In this example, the UE may experience a maximum frequency offset Δf of 200 Hz in CoMP JT. The UE transitions a signal having a carrier frequency offset in an RF band to a pass band. Even though the signal having a carrier frequency offset is subjected to a carrier frequency elimination process, it is not perfectly eliminated and instead, it may serve as a residual frequency. This may be formulated as $S(t)e^{j2\pi\Delta ft}$. That is, the phase of a received signal s(t) continuously changes over time and the phase variation rate is determined by the carrier frequency offset Δf.

The phase offset information report aiming at maximized reinforcement of signals received at a UE in CoMP JT may become inaccurate in the presence of a carrier frequency offset. Moreover, a time gap i may exist between the time of reporting channel information from the UE by estimating channels between the UE and transmission points and the time of receiving signals in CoMP JT. In case a carrier frequency offset is generated, a signal is transmitted on a channel distorted with a phase variation of $e^{j2\pi\Delta ft}$ relative to the reported channel information. The channel distortion renders the UE-reported phase offset information inaccurate.

This means that CoMP JT efficiency cannot be maximized by performing CoMP JT without considering a frequency offset. Accordingly, the present invention proposes to report carrier frequency offset information to maximize the effectiveness of cooperative transmission (the afore-described CoMP transmission schemes, particularly CoMP JT) between two or more transmission points. Specifically, a UE may estimate carrier frequency offsets between the transmission points and report frequency offset information to a network through a transmission point (e.g. a serving cell).

A carrier frequency offset is the difference between the reception frequencies of signals (e.g. CRSs or CSI-RSs as described later) transmitted two or more transmission points. The carrier frequency offset may be defined as a Reference Signal Frequency Offset (RSFO) as described in [Table 4] below.

TABLE 4

| Definition | Reference signal frequency offset (RSFO), is defined as the difference between carrier frequency of the TP transmitting the corresponding RS and that of the reference TP For RSFO determination, CSR or CSI-RS may be considered. The reference transmission point for RSFO shall/may be a transmission point that currently serves the UE. |
|---|---|

TABLE 4-continued

| Application | RRC_IDLE intra-frequency RRC_IDLE inter-frequency RRC_CONNECTED intra-frequency RRC_CONNECTED inter-frequency |
|---|---|

A carrier frequency offset report may be transmitted in a measure report by Layer 3 (L3) signaling or may be transmitted by Layer 1/Layer 2 (L1/L2) signaling (e.g. included in a CSI report). Inclusion of a carrier frequency offset report in a measurement report will first be described below.

Figure 7:
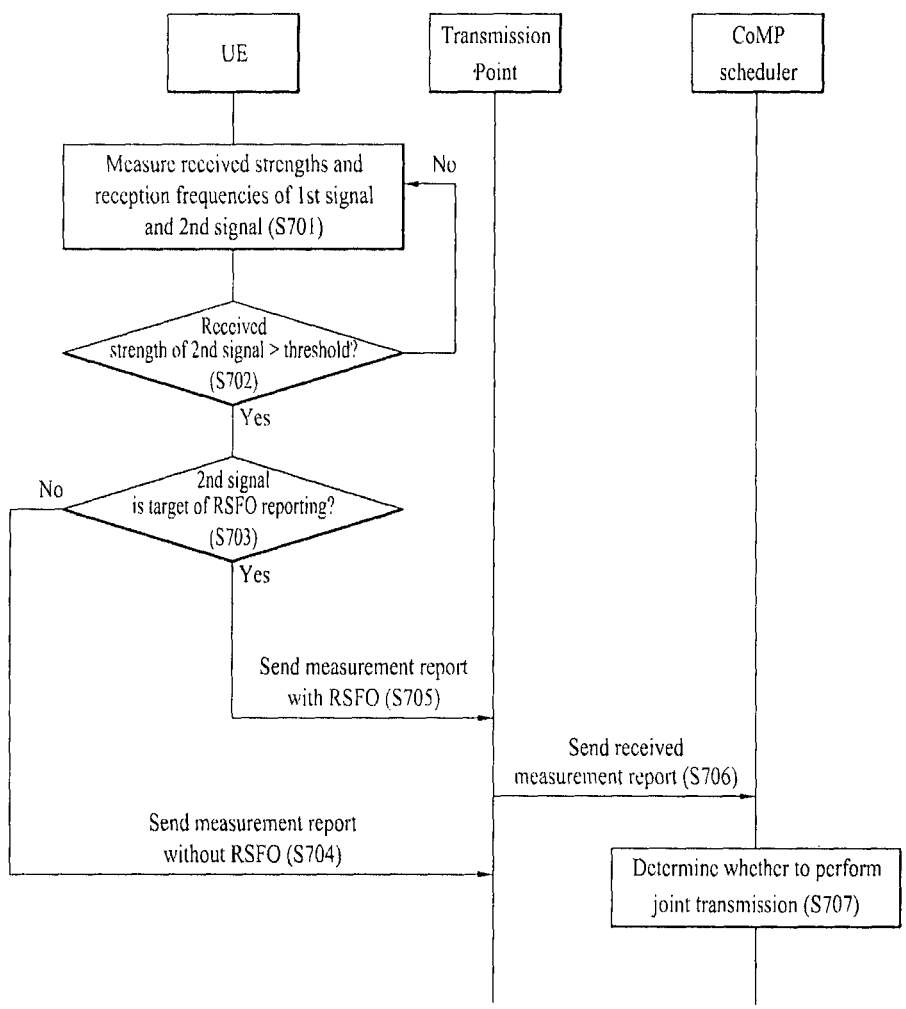
FIGS. 7, 8 and 9 are views referred to for describing an embodiment of the present invention.

FIG. 7 is a flowchart illustrating an operation for reporting an RSFO measurement according to an embodiment of the present invention.

Referring to FIG. 7, a UE may measure the received strengths (e.g. RSRPs) and/or reception frequencies of first and second signals (S701). As described later, the first and second signals may be CRSs or CSI-RSs. It is assumed herein that the first signal is a reference signal for RSFO determination.

The UE may compare the received strength of the second signal with a threshold (S702). If the received strength of the second signal exceeds the threshold, the UE may determine whether the second signal is the target of RSFO reporting (S703).

If the UE determines that the second signal is the target of RSFO reporting, the UE may measure RSFO and transmit a measurement report including the RSFO to a transmission point (S705). The measurement report may include measurements used in the legacy LTE/LTE-A systems, such as an RSRP, in addition to the RSFO. On the contrary, if the UE determines that the second signal is not the target of RSFO reporting, the UE may transmit a measurement report without the RSFO to the transmission point (S704).

Upon receipt of the measurement report including the RSFO, the transmission point may transmit the received measurement report to a CoMP scheduler (S706). The CoMP scheduler is a physical or logical entity incorporated into a network entity such as a Mobility Management Entity (MME), a Serving GateWay (SGW), a Packet data network GateWay (PGW), etc., or an independent entity. Or the CoMP scheduler may be a physical or logical entity incorporated into a main transmission point among a plurality of transmission points forming a CoMP cluster.

The CoMP scheduler may determine whether to perform CoMP JT through transmission points related to the first and second signals based on the measurement report including the RSFO (S707). The CoMP scheduler may define transmission points having strong signals determined based on RSRPs/RSRQs reported by the UE as a CoMP measurement set. Further, to increase the gain of CoMP JT, the CoMP scheduler may select transmission points having small carrier frequency offsets with respect to one another. The CoMP measurement set may be determined semi-statically and may be indicated to the UE by Radio Resource Control (RRC) signaling. Or if the CoMP scheduler configures a CoMP measurement set with transmission points having large carrier frequency offsets, it may predict that phase offset information to be fed back from the UE will be inaccurate. Therefore, the CoMP scheduler may command the UE not to transmit phase offset information in addition to channel information by an RRC signal, thereby decreasing unnecessary feedback overhead. In another example, an eNB may correct the transmission frequency of an oscillator used in each of transmission points based on RSFO reports received from a plurality of UEs so that the transmission frequencies of signals transmitted from the transmission points are almost identical.

While not shown, the above-described measurement report may further include a Reference Signal Time Difference (RSTD) defined as the difference between the times of RSs transmitted by the transmission points related to the first and second signals. The RSTD may be defined as described in [Table 5] below and apply to RRC-IDLE/RRC-CONNECTED state of intra-frequency/inter-frequency.

TABLE 5

| | |
|---|---|
| Definition | The relative timing difference between the neighbour cell j and the reference cell i, defined as $T_{SubframeRxj}$ − $T_{SubframeRxi}$, where: $T_{SubframeRxj}$ is the time when the UE receives the start of one subframe from cell j, $T_{SubframeRxi}$ is the time when the UE receives the corresponding start of one subframe from cell i that is closest in time to the subframe received from cell j. The reference point for the observed subframe time difference shall/may be the antenna connector of the UE. |
| Application | RRC_IDLE intra-frequency, RRC_IDLE inter-frequency, RRC_CONNECTED intra-frequency, RRC_CONNECTED inter-frequency |

Now a description will be given of a case where the first and second signals are CRSs in FIG. 7, with reference to FIG. 8.

Figure 8:
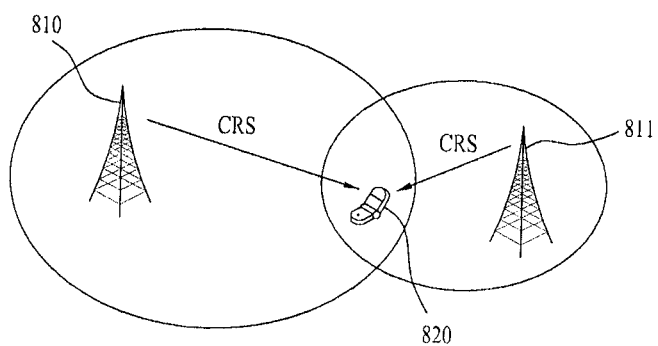

In FIG. 8, a UE 820, a first transmission point 810 being a serving cell of the UE 820, and a second transmission point 811 being a neighbor cell of the first transmission point 810 are illustrated. It is assumed that the first transmission point 810 transmits a CRS as the first signal and the second transmission point 811 transmits a CRS as the second signal.

In this case, the transmission point 810 being the serving cell may be a reference cell for RSFO measurement. The RSFO may refer to the difference (i.e. offset) between the carrier frequency of the CRS transmitted by the second transmission point 811 and the carrier frequency of the CRS transmitted by the first transmission point 810.

For this operation, an eNB may transmit information about CRSs transmitted by adjacent/neighbor transmission points on which RSFOs are to be measured, a neighbor CRS list, or a neighbor physical cell Identifier (ID) list to a UE and the UE may report only RSFO information about the CRSs included in the list to the eNB. That is, the aforedescribed second signal may be listed in the neighbor CRS list or the second transmission point 811 may be listed in the neighbor physical cell ID list.

It may be individually indicated whether an RSFO needs to be measured for a CRS transmitted by a specific transmission point in neighbor cell information included in a neighbor cell list transmitted for mobility management by the serving cell. That is, the first transmission point may indicate the second transmission point in the neighbor cell list.

The UE measures the RSRPs of CRSs received from neighbor cells. If any of the RSRPs exceeds a predetermined threshold, the UE reports the RSRP. If at least the neighbor cell or CRS form a specific neighbor cell is subject to RSFO measurement, the UE may report the RSFO measurement along with the RSRP. If at least the neighbor cell or CRS form a specific neighbor cell is subject to RSFO measurement, the UE may report measurement without RSFO.

Meanwhile, the first and second signals may be CSI-RSs. In the case where a plurality of transmission points transmit CSI-RSs, a CSI-RS list related to cooperative transmission for RSFO measurement, called CoMP Resource Management Set (CRMS) may be defined. A CRMS configuration may include 'CSI-RS config' of CSI-RSs included in the CRMS. Since some CSI-RSs are transmitted at different positions, they may differ in both RSRP and RSFO due to use of different oscillators. On the other hand, some CSI-RSs are transmitted at the same positions by sharing the same oscillator and thus they may differ only in received signal energy due to different antenna beam patterns. That is, two CSI-RSs may be identical in RSFO and different in RSRP. To reduce the overhead of RRM measurement/reporting and UE measurement complexity in such various cases, an eNB may indicate CSI-RSs which are RSFO measurement targets in a CSI-RS list to a UE, when the eNB sets a CRMS configuration for the UE. A reference RS for RSFO measurement may be the first CSI-RS listed in a CSI-RS list of the CRMS. The UE measures the RSRPs of CSI-RSs. If any of the RSRPs exceeds a predetermined threshold, the UE reports the RSRP of a corresponding CSI-RS. If the CSI-RS has already been indicated as an RSFO measurement target, the UE may report the RSFO related to the CSI-RS as well as the RSRP of the CSI-RS. If the CSI-RS is not an RSFO measurement target, the UE reports only the RSRP of the CSI-RS.

Figure 9:
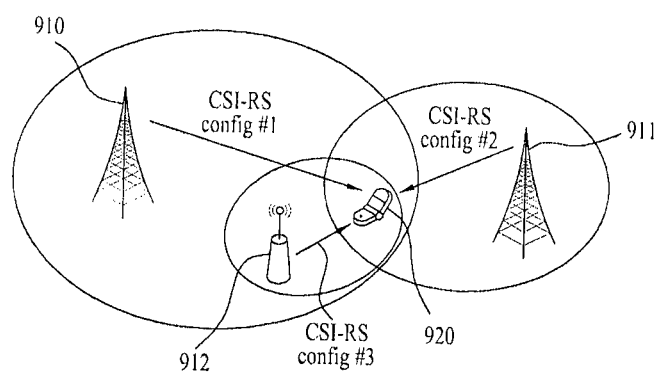

FIG. 9 is a view referred to for describing a case where first and second signals are CSI-RSs. If the first and second signals are CSI-RSs, this may imply that RRM measurement is performed on CSI-RSs. Referring to FIG. 9, a first transmission point 910 as a serving cell of a UE, a second transmission point 911 being a neighbor cell of the first transmission point 910, and a third transmission point 912 that may be a distributed antenna of the first transmission point 910, a Remote Radio Head (RRH), or a picocell are illustrated, by way of example. It is assumed that the first transmission point 910 transmits CSI-RSs according to a first CSI-RS configuration (CSI-RS config #1), the second transmission point 911 transmits CSI-RSs according to a second CSI-RS configuration (CSI-RS config #2), and the third transmission point 912 transmits CSI-RSs according to a third CSI-RS configuration (CSI-RS config #3). A CSI-RS config includes 'antennaPortsCount-r10' specifying the number of antennas (1, 2, 4 or 8) through which CSI-RSs are transmitted, 'resourceConfig-r10' indicating REs carrying the CSI-RSs in one RB in the time-frequency resources, and 'subframeConfig-r10' indicating a subframe carrying the CSI-RSs.

In the exemplary environment illustrated in FIG. 9, a CRMS may include CSI-RS config #1, CSI-RS config #2, and CSI-RS config #3 and CSI-RS config #1 and CSI-RS config #2 may be indicated for RSFO measurement in the CRMS. In the case where the first signal is a CSI-RS transmitted according to CSI-RS config #1 and the second signal is a CSI-RS transmitted according to CSI-RS config #2, if the RSRP of the second signal exceeds a threshold, the UE may include the frequency offset between the first and second signals, that is, an RSFO in an measurement report. In the case where the first signal is a CSI-RS transmitted according to CSI-RS config #1 and the second signal is a CSI-RS transmitted according to CSI-RS config #3, even though the RSRP of the second signal exceeds a threshold, the UE does not report the RSFO because the second signal is not indicated for RSFO measurement.

Inclusion of an RSFO in a measurement report has been described above. Now a description will be given of methods for transmitting an RSFO by L1/L2 signaling. Aforegiven descriptions (e.g. the descriptions of CRSs and CSI- RSs for RSFO measurement, etc.) other than a description of the RSFO signaling methods are still apply in the following description.

An RSFO may be fed back according to a carrier frequency offset change rate. The RSFO may be included in a periodic PUCCH-based CSI repot or an aperiodic PUSCH-based CSI report. The reporting period and method of carrier frequency offset information may be set independently of other periodic CSI reporting periods/patterns. That is, an RSFO may be reported in a shorter or longer period than a CSI reporting period. Aside from an aperiodic CSI report, RSFO-only reporting may be triggered aperiodically.

The overhead of RSFO transmission may be controlled by setting various quantization levels. For example, if a carrier frequency offset ranges from −100 Hz to 100 Hz, 4-bit information is required for 16-level quantization. In another example, a carrier frequency offset may be fed back in the form of an 'up/down command'. Given 2 bits, the 'up/down command' may be represented as +3, +1, −1 or −3 and the carrier frequency offset may be calculated by accumulating the value of the 'up/down command' to the previous RSFO. However, this is purely exemplary. Thus various 'up/down command' values may be set in every feedback period, taking into account a carrier frequency offset variation.

Figure 10:
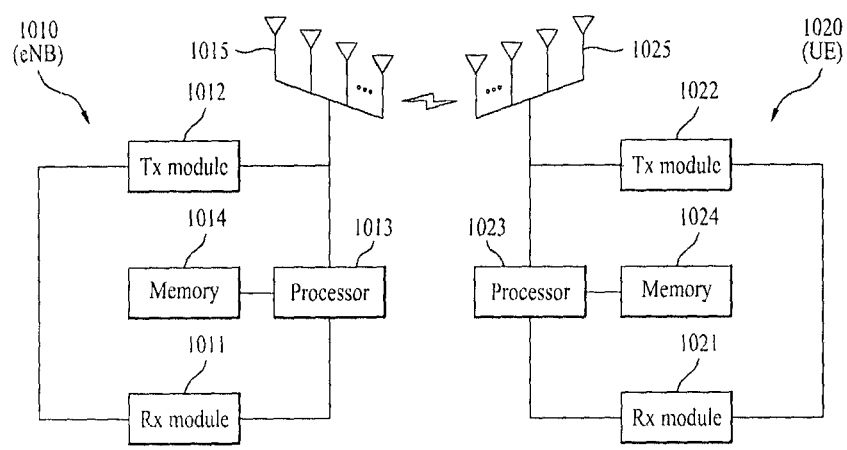
FIG. 10 is a block diagram of a transmission apparatus and a reception apparatus.

FIG. 10 is a block diagram of a transmission point and a UE according to an embodiment of the present invention.

Referring to FIG. 10, a transmission point 1010 according to the present invention may include an Rx module 1011, a Tx module 1012, a processor 1013, a memory 1014, and a plurality of antennas 1015. The plurality of antennas 1015 are used to support MIMO transmission and reception. The Rx module 1011 may receive uplink signals, data and information from a UE. The Tx module 1012 may transmit downlink signals, data and information to a UE. The processor 1013 may provide overall control to the operations of the transmission point 1010.

In accordance with an embodiment of the present invention, the processor 1013 may process necessary information in the afore-described measurement report, handover, random access, etc.

Besides, the processor 1013 processes information received by the transmission point 1010 and information to be transmitted from the transmission point 1010. The memory 1014 may store the processed information for a predetermined time and may be replaced with a component such as a buffer (not shown).

A UE 1020 according to the present invention may include an Rx module 1021, a Tx module 1022, a processor 1023, a memory 1024, and a plurality of antennas 1025. The plurality of antennas 1025 are used to support MIMO transmission and reception. The Rx module 1021 may receive downlink signals, data and information from an eNB. The Tx module 1022 may transmit uplink signals, data and information to an eNB. The processor 1023 may provide overall control to the operations of the UE 1020.

In accordance with an embodiment of the present invention, the processor 1023 may process necessary information in the afore-described measurement report, handover, random access, etc.

Besides, the processor 1023 processes information received by the UE 1020 and information to be transmitted from the UE 1020. The memory 1024 may store the processed information for a predetermined time and may be replaced with a component such as a buffer (not shown).

One or more of the above-described embodiments of the present invention may apply to the configurations of the transmission point and the UE, independently or in combination. Redundant descriptions are avoided for clarity.

The description of the transmission point 1010 may apply to a relay as a downlink transmission entity or an uplink reception entity, and the description of the UE 1020 may apply to the relay as a downlink reception entity or an uplink transmission entity in FIG. 10.

MODE FOR INVENTION

Various embodiments have been described in the best mode for carrying out the invention.

INDUSTRIAL APPLICABILITY

The embodiments of the present invention are applicable to various mobile communication systems.

The embodiments of the present invention may be achieved by various means, for example, hardware, firmware, software, or a combination thereof. In a hardware configuration, an embodiment of the present invention may be achieved by one or more ASICs (application specific integrated circuits), DSPs (digital signal processors), DSDPs (digital signal processing devices), PLDs (programmable logic devices), FPGAs (field programmable gate arrays), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

The detailed description of the preferred embodiments of the present invention is given to enable those skilled in the art to realize and implement the present invention. While the present invention has been described referring to the preferred embodiments of the present invention, those skilled in the art will appreciate that many modifications and changes can be made to the present invention without departing from the spirit and essential characteristics of the present invention. For example, the structures of the above-described embodiments of the present invention can be used in combination. The above embodiments are therefore to be construed in all aspects as illustrative and not restrictive. Therefore, the present invention intends not to limit the embodiments disclosed herein but to give a broadest range matching the principles and new features disclosed herein.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Therefore, the present invention intends not to limit the embodiments disclosed herein but to give a broadest range matching the principles and new features disclosed herein. It is obvious to those skilled in the art that claims that are not explicitly cited in each other in the appended claims may be presented in combination as an embodiment of the present invention or included as a new claim by a subsequent amendment after the application is filed.

The invention claimed is:

1. A method for transmitting a measurement report at a User Equipment (UE) in a wireless communication system supporting a coordinated multi-point (CoMP), the method comprising:
   measuring, by the UE, received strengths and reception frequencies of first and second signals respectively transmitted from first and second transmission points in a CoMP measurement set;
   calculating a frequency offset between the reception frequencies; and
   transmitting, by the UE to the first transmission point, a measurement report including information on the frequency offset between the first and second signals, if the received strength of the second signal is equal to or larger than a predetermined threshold,
   wherein the information on the frequency offset is used to support cooperative transmission of transmission points transmitting the first and second signals, and
   wherein a transmission period for the measurement report is determined based on a frequency offset change rate.

2. The method according to claim 1, wherein the support of cooperative transmission includes at least one of determination as to whether the transmission points are to perform cooperative transmission, determination of a cooperative transmission scheme of the transmission points, or correction of transmission frequencies of one or more of the transmission points.

3. The method according to claim 1, wherein the first signal is a cell-specific reference signal transmitted by a first transmission point being a serving cell of the UE and the second signal is a cell-specific reference signal transmitted by a second transmission point being neighbor cell of the serving cell.

4. The method according to claim 3, wherein the second transmission point is included in a neighbor cell list received from the first transmission point.

5. The method according to claim 3, wherein the second transmission point is indicated in a neighbor cell list received from the first transmission point by the first transmission point.

6. The method according to claim 1, wherein the first and second signals are Channel State Information-Reference Signals (CSI-RSs).

7. The method according to claim 6, wherein the first and second signals are indicated for frequency offset reporting in a CSI-RS list related to cooperative transmission.

8. The method according to claim 7, wherein the first signal is a first CSI-RS listed in the CSI-RS list.

9. The method according to claim 8, wherein the CSI-RS list includes a plurality of CSI-RS configurations.

10. The method according to claim 1,
   wherein the measurement report further includes a Reference Signal Time Difference (RSTD) between the transmission points transmitting the first and second signals, and
   wherein the RSTD is used to support the cooperative transmission.

11. The method according to claim 10, wherein the RSTD is the difference between the starts of subframes received from the transmission points.

12. The method according to claim 1, wherein the cooperative transmission is joint transmission.

13. The method according to claim 1, further comprising:
   measuring, by the UE, a phase offset of the first and second signals; and
   transmitting, by the UE to the first transmission point, information on the phase offset when the frequency offset is less than a predetermined value.

14. A User Equipment (UE) in a wireless communication system supporting a coordinated multi-point (CoMP), comprising:
   a transmitter; and
   a processor, wherein the processor is configured to:
      measure received strengths and reception frequencies of first and second signals respectively transmitted from first and second transmission points in a CoMP measurement set,
      calculate a frequency offset between the reception frequencies, and
      transmit a measurement report to the first transmission point, the measurement report including information on the frequency offset between the first and second signals, if the received strength of the second signal is equal to or larger than a predetermined threshold,
      wherein the information on the frequency offset is used to support cooperative transmission of transmission points transmitting the first and second signals, and
      wherein a transmission period for the measurement report is determined based on a frequency offset change rate.

15. A method for receiving a measurement report, by a first transmission point in a wireless communication system supporting a coordinated multi-point (CoMP), the method comprising:
   receiving a measurement report from a User Equipment (UE) that has received first and second signals respectively transmitted from first and second transmission points in a CoMP measurement set,
   wherein the measurement report includes a frequency offset between the first and second signals, if the received strength of the second signal is equal to or larger than a predetermined threshold,
   wherein the information on the frequency offset is used to support cooperative transmission of transmission points transmitting the first and second signals, and
   wherein a transmission period for the measurement report is determined based on a frequency offset change rate.

16. A first transmission point in a wireless communication system supporting a coordinated multi-point (CoMP), comprising:
   a receiver; and
   a processor, wherein the processor is configured to:
      receive a measurement report from a User Equipment (UE) that has received first and second signals respectively transmitted from first and second transmission points in a CoMP measurement set,
      wherein the measurement report includes information on a frequency offset between the first and second signals, if the received strength of the second signal is equal to or larger than a predetermined threshold,
      wherein the frequency offset is used to support cooperative transmission of transmission points transmitting the first and second signals, and
      wherein a transmission period for the measurement report is determined based on a frequency offset change rate.

* * * * *